United States Patent [19]

Noguchi et al.

[11] Patent Number: 4,958,352

[45] Date of Patent: Sep. 18, 1990

[54] SEMICONDUCTOR MEMORY DEVICE WITH ERROR CHECK AND CORRECTING FUNCTION

[75] Inventors: Kenji Noguchi; Tsuyoshi Toyama; Shinichi Kobayashi; Nobuaki Andoh; Kenji Kohda, all of Hyogo, Japan

[73] Assignee: Mitsubishi Denki Kabushiki Kaisha, Tokyo, Japan

[21] Appl. No.: 253,001

[22] Filed: Oct. 4, 1988

[30] Foreign Application Priority Data

Oct. 5, 1987 [JP] Japan .................................. 62-251930

[51] Int. Cl.[5] ............................................ G06F 11/10
[52] U.S. Cl. ..................................... 371/40.1; 371/5.1
[58] Field of Search ................. 371/5.1, 5.3, 5.5, 40.1, 371/40.2, 40.3

[56] References Cited

U.S. PATENT DOCUMENTS

| | | | |
|---|---|---|---|
| 3,814,922 | 6/1974 | Nibby et al. | 371/40.1 |
| 4,053,751 | 10/1977 | Ault | 371/5.3 |
| 4,584,681 | 4/1986 | Singh et al. | 371/5.1 |
| 4,612,640 | 9/1986 | Mehrotra et al. | 371/40.1 |
| 4,809,276 | 2/1989 | Lemay et al. | 371/40.1 |

FOREIGN PATENT DOCUMENTS 2359776 2/1984 Fed. Rep. of Germany .

OTHER PUBLICATIONS

H. Kawashima et al. "64K Bit EEPROM with on chip ECC", Technical Report of Institute of Electronics and Communication Engineering of Japan, vol. 86, No. 1 (1986), pp. 51–56.

D. Cioaca et al "A Million-Cycle CMOS 256K EEPROM" 1987 IEEE International Solid-State Circuits Conference, Digest of Technical Papers (Feb. 25, 1987), pp. 78, 79.

*Primary Examiner*—Charles E. Atkinson
*Attorney, Agent, or Firm*—Lowe, Price, LeBlanc, Becker & Shur

[57] ABSTRACT

An EEPROM having an ECC circuit further comprises a counter circuit. The ECC circuit checks and corrects bit errors included in data read out from a memory cell array. In addition, the ECC circuit generates a predetermined signal every time it corrects a bit error. The counter circuit counts a predetermined signal generated from the ECC circuit.

15 Claims, 9 Drawing Sheets

000
SEMICONDUCTOR MEMORY DEVICE WITH ERROR CHECK AND CORRECTING FUNCTION

BACKGROUND OF THE INVENTION

1. Field of the Invention

The present invention relates generally to semiconductor memory devices, and more particularly, to a semiconductor memory device having an error check and correcting function.

2. Description of the Prior Art

Recently, in a semiconductor memory device, soft errors with high integration density has become a problem. In addition, malfunctions due to, for example, destruction of a cell caused by a cell structure occur by repeatedly writing and erasing data. In order to solve the problems, a semiconductor memory device comprising an error check and correcting (referred to as ECC hereinafter) function on the same semiconductor substrate is disclosed in, for example, "64K Bit EEPROM Containing ECC", Technical Report of Institute of Electronics and Communication Engineers of Japan, Vol. 86, No. 1.

FIG. 1 is a block diagram showing an example of a structure of a conventional EEPROM (Electrically Erasable and Programmable Read Only Memory) comprising an ECC circuit.

In FIG. 1, a memory cell array 1 includes a memory cell array 1a for storing main data and a memory cell array 1b for storing check data. In the memory cell array 1, a plurality of word lines and a plurality of bit lines are arranged intersecting with each other, memory cells being provided at intersections thereof. In FIG. 1, there are typically shown only a single word line WL, a single bit line BL and a single memory cell 101 provided at intersections thereof.

An X address buffer 2 detects, waveform-shapes and amplifies input signals X0 to Xn, to apply the same to an X decoder 3. The X decoder 3 is responsive to the input signals X0 to Xn applied from the X address buffer 2 for selecting any of the word lines in the memory cell array 1a for storing main data. On the other hand, a Y address buffer 4 detects, waveform-shapes and amplifies input signals Y0 to Ym, to apply the same to a Y decoder 5. The Y decoder 5 is responsive to the input signals Y0 to Ym applied from the Y address buffer 4 for selecting any of the bit lines in the memory cell array 1a for storing main data through a Y gate circuit 6. Data D0 to D7 are inputted and outputted to and from a data pin 7. At the time of writing data, the data D0 to D7 applied to the data pin 7 are detected, waveform-shaped and amplified by an input buffer 8. The data D0 to D7 outputted from the input buffer 8 are transmitted to the selected bit lines in the memory cell array 1a for storing main data through the Y gate circuit 6, and further latched in a column latch high voltage switch 18. In addition, the data D0 to D7 outputted from the input buffer 8 are also applied to a check bit generating circuit 9. The check bit generating circuit 9 checks the data D0 to D7 and generates check bit data P1 to P4 of four bits. The check bit data P1 to P4 outputted from the check bit generating circuit 9 are transmitted to the bit lines in the memory cell array 1b for storing check data, and further latched in the column latch high voltage switch 18.

At the time of reading out data, a sense amplifier 10 detects and amplifiers the data D0 to D7 and the check bit data P1 to P4 read out from the memory cell array 1 through the Y gate circuit 6. An ECC circuit 11 checks the data D0 to D7 read out through the sense amplifier 10 in response to the check bit data P1 to P4, to automatically detect and correct a failure bit of one bit when the same is generated. The data D0 to D7 outputted from the ECC circuit 11 are outputted to the exterior from the data pin 7 through an output buffer 12.

A control signal buffer 13, a read/write control circuit 14, an erase/program control circuit 15, a high voltage generating circuit 16 and a read control circuit 17 are responsive to a chip enable signal $\overline{CE}$ an output enable signal $\overline{OE}$ a write enable signal $\overline{WE0}$ and the like which are externally applied for controlling reading, writing or outputting of data in the memory cell array 1 or bringing a chip to the operating state or the standby state. The column latch high voltage switch 18 latches the data D0 to D7 and the check bit data P1 to P4 as inputted, and applies a high voltage to the bit line BL at the time of programming while applying a high voltage to a control gate line CGL at the time of erasing. A word line high voltage switch 19 applies a high voltage to the word line WL at the time of programming and erasing.

FIG. 2 is a cross-sectional view of a memory cell 101 included in the EEPROM shown in FIG. 1. In FIG. 2, the memory cell 101 comprises a selecting transistor 102 and a memory transistor 103. The selecting transistor 102 includes an N+ layer 104 and an N+ layer 105 formed in a P type silicon substrate 100 and a gate electorode 106. The memory transistor 103 includes the N+ layer 105 and an N+ layer 107 formed in the P type silicon substrate 100, a floating gate 108 and a control gate 109. As described above, a gate of the memory transistor 103 has a two-layer structure covered with an insulating layer (not shown). The N+ layer 105 becomes a source of the selecting transistor 102 and a drain of the memory transistor 103. Binary data "0" and "1" are stored in the memory cell 101 corresponding to the change in threshold voltage caused by storing positive or negative charges in the floating gate 108. A part of an insulating layer between the floating gate 108 and the N+ layer 105 is formed of a very thin oxide film. The N+ layer 104 in the selecting transistor 102 is connected to a bit line BL, and the gate electrode 106 therein is connected to a word line WL. The control gate 109 in the memory transistor 103 is connected to a control gate line CGL.

FIG. 3 is a circuit diagram showing a structure of the check bit generating circuit 9 included in the EEPROM shown in FIG. 1. As shown in FIG. 3, the check bit generating circuit 9 comprises four exclusive logical sum circuits (referred to as EXOR circuits hereinafter) 91 to 94. Four or five of the data D0 to D7 are applied to four or five input terminals of each of the EXOR circuits 91 to 94. Each of the EXOR circuits 91 to 94 outputs "0" when the number of data "1" as inputted is an even number while outputting "1" when the number is an odd number. The check bit data P1 to P4 are outputted from the four EXOR circuits 91 to 94, respectively.

FIG. 4 is a circuit diagram showing a structure of the ECC circuit 11 included in the EEPROM shown in FIG. 1. As shown in FIG. 4, the ECC circuit 11 comprises EXOR circuits 121 to 124, inverters 131 to 134, logical product circuits (referred to as AND circuits hereinafter) 140 to 147 and EXOR circuits 150 to 157. Four or five of the data D0 to D7 and one of the check bit data P1 to P4 are applied to five or six input terminals of each of the EXOR circuits 121 to 124. Outputs Ml to M4 are obtained by the four EXOR circuits 121 to 124, respectively. In addition, the outputs Ml to M4 are inverted by the inverters 131 to 134, respectively, to obtain inverted outputs $\overline{M1}$ to $\overline{M4}$ The output Ml or the inverted output $\overline{M1}$, the output M2 or the inverted output $\overline{M2}$, the output M3 or the inverted output $\overline{M3}$ and the output M4 or the inverted output $\overline{M4}$ are applied to four input terminals of each of the AND circuits 140 to 147, respectively. An output of each of the AND circuits 140 to 147 is applied to one input terminal of corresponding one of the EXOR circuits 150 to 157. The EXOR circuits 150 to 157 have their other input terminals receiving the data D0 to D7, respectively. Outputs $D_{0a}$ to $D_{7a}$ are obtained by the EXOR circuits 150 to 157, respectively.

The EXOR circuits 121 to 124 check bits as inputted and check bits. In addition, the EXOR circuits 150 to 157 correct bit errors.

Description is now made on an operation of the EEPROM shown in FIG. 1 in the order of (1) erasing and programming operations in the memory cell, (2) a writing operation of data, and (3) a reading operation of data.

(1) Erasing and programming operations in the memory cell

In the erasing operation and the programming operation, electrons are tunneled through a thin oxide film between the floating gate 108 and the N+ layer 105 (in FIG. 2).

The erasing operation means that a threshold voltage of the memory transistor 103 is shifted higher by injecting electrons into the floating gate 108, to store data "1" in the memory cell 101. The erasing operation is performed by bringing the bit line BL to the ground potential and applying a high voltage to the word line WL and the control gate line CGL.

The programming operation means that a threshold voltage of the memory transistor 103 is shifted lower by emitting electrons from the floating gate 108, to store data "0" in the memory cell 101. The programming operation is performed by bringing the control gate line CGL to the ground potential and applying a high voltage to the word line WL and the bit line BL.

(2) Writing operation of data

In FIG. 1, when the chip enable signal $\overline{CE0}$ and the write enable signal $\overline{WE0}$ are first inputted, there is formed a line of the control signal buffer 13, the read/write control circuit 14, the erase/program control circuit 15 and the high voltage generating circuit 16.

A word line WL is selected in response to signals inputted through the X address buffer 2 and the X decoder 3, while bit lines BL are selected in response to signals inputted through the Y address buffer 4, the Y decoder 5 and the Y gate circuit 6. When the data D0 to D7 are inputted through the data pin 7, the data are transmitted to the selected bit lines BL in the memory cell array 1a for storing main data through the input buffer 8 and the Y gate circuit 6, and further latched in the column latch high voltage switch 18.

On the other hand, the data D0 to D7 outputted from the input buffer 8 are also inputted to the check bit generating circuit 9, where the check bit data P1 to P4 of four bits are generated. The check bit data P1 to P4 are transmitted to the bit lines BL in the memory cell array 1b for storing check data through the Y gate circuit 6, and further latched in the column latch high voltage switch 18.

The check bit data P1 to P4 are generated by the EXOR circuits 91 to 94 to which four or five data out of the data D0 to D7 are inputted (see FIG. 3). For example, if the inputted data D0 to D7 are (0,1,0,1,0,1 0,1,) in that order, the check bit data P1 to P4 are (0,1,1,1) in that order. When latch of addresses and data are completed, a high voltage is supplied to the column latch high voltage switch 18 and the word line high voltage switch 19 by the high voltage generating circuit 16, so that the memory cell array 1 is activated. Consequently, data is written to a desired memory transistor 103 in response to the erasing/programming operation in the above described memory cell.

(3) Reading operation of data

When the chip enable signal $\overline{CE0}$ and the output enable signal $\overline{OE0}$ are first inputted, the control signal buffer 13, the read/write control circuit 14, the read control circuit 17, the sense amplifier 10 and the output buffer 12 are activated.

Thereafter, a word line WL is selected in response to signals inputted through the X address buffer 2 and the X decoder 3, and bit lines BL are selected in response to signals inputted through the Y address buffer 4, the Y decoder 5 and the Y gate circuit 6. Consequently, the data D0 to D7 and the check bit data P1 to P4 in the memory cells at intersections of the selected word line WL and the selected bit lines BL are applied to the ECC circuit 11 through the bit lines BL, the Y gate circuit 6 and the sense amplifier 10.

More specifically, the data D0 to D7 and the check bit data P1 to P4 are first inputted to the EXOR circuits 121 to 124 in the same combination as that selected in the check bit generating circuit 9 at the time of writing (see FIG. 4). The check bit data P1 to P4 are previously determined such that the number of "1" in corresponding data (for example, D0, D1, D2 and D3 in the case of P1) becomes an even number. Thus, if a failure does not occur in the memory transistor 103, all the outputs Ml to M4 from the EXOR circuits 121 to 124 attain an "L" level, and all the inverted outputs $\overline{M1}$ to $\overline{M4}$ from the inverters 131 to 134 attain an "H" level. Consequently, all the outputs of the AND circuits 140 to 147 in the next stage attain the "L" level. Eventually, all the input data D0 to D7 become the outputs $D_{0a}$ to $D_{7a}$ of the EXOR circuits 150 to 157 in the final stage without any modification, respectively.

Let's consider a case in which one of the memory transistors 103 fails, so that one bit, for example, the data D3, which is essentially to be "1" but erroneously become "0", is inputted to the ECC circuit 11.

In this case, data inputted to the EXOR circuit 121 becomes (0, 1, 0, 0, 0) and data inputted to the EXOR circuit 124 become (1, 0, 0, 0, 1, 1), so that outputs M1 and M4 attain the "H" level and the inverted outputs $\overline{M1}$ and $\overline{M4}$ attain the "L" level. Both the outputs M2 and M3 attain the "L" level because the data D3 is not inputted. Thus, data inputted to the AND circuit 143 out of the AND circuits 140 to 147 in the next stage become (1, 1, 1, 1,). Consequently, an output of the AND circuit 143 attains the "H" level while outputs of the other AND circuits 140 to 142 and 144 to 147 all attain the "L" level. If the outputs of the AND circuits 140 to 147 are at the "L" level, the level in phase with the other input signal, i.e., the data D0 to D7 is outputted from the EXOR circuits 150 to 157 in the next stage.

In this case, since the outputs of all the AND circuits 140 to 142 and 144 to 147 excluding the AND circuit 143 are at the "L" level, the inputted data D0 to D2 and D4 to D7 become the outputs $D_{0a}$ to $D_{2a}$ and $D_{4a}$ to $D_{7a}$ without any modification. On the other hand, since the output of the AND circuit 143 is at the "H" level, the output $D_{3a}$ becomes data obtained by inverting the other data D3 inputted to the EXOR circuit 153.

In the above described manner, the data D3 in the faulty memory transistor 103 is checked and corrected in the ECC circuit 11. Consequently, the same data D0 to D7 as that as inputted are outputted from the data pin 7 through the output buffer circuit 12.

Although description was made on a case in which a bit error occurs in one of the data D0 to D7 out of the 12-bit data (D0 to D7 and P1 to P4) simultaneously written in the memory cell array 1, a bit error may occur in one of the check bit data P1 to P4, in which case the normal data D0 to D7 are outputted from the ECC circuit 11.

The conventional EEPROM has the above described structure. Thus, if a bit failure in the same byte is one bit or less, the bit failure is checked and corrected in the ECC circuit 11, and thus remedied. However, the EEPROM cannot understand how many bytes in one chip are remedied in the ECC circuit.

Let's consider an EEPROM having storage capacity of 64 kilobits, i.e., 8192 bytes. Assuming that the above described ECC circuit is contained in the EEPROM, bit failures may be checked and corrected in any of the following cases: (1) the number of faulty memory transistors is 8192, (2) the number is 10 and (3) the number is 0. Therefore, the EEPROM in which the bit failures are detected and corrected can be employed as normal one. However, the EEPROM cannot understand how many bytes in one chip are remedied by the ECC circuit.

In the above described cases, the EEPROM is apparently normal. However, in the case (1), a failure of one additional memory transistor is not thereafter permitted. On the other hand, in the case (2), failures up to 8182 memory transistors may be permitted. In addition, in the case (3), failures up to 8192 memory transistors may be permitted. Thus, in the cases, there occurs a large difference in reliability of the EEPROM.

However, if writing/erasing of data to/from the memory transistor is repeated, the destruction thereof is liable to occur. Under the present condition, this cannot be avoided to some degree from the point of view of the structure of the memory transistor. If the reliability of the EEPROM can be evaluated by understanding the states such as the above described cases (1) to (3), it can be determined whether or not the EPROM can be continuously used. In addition, substantially effective information is obtained so as to make an improvement in the design or the manufacturing process.

SUMMARY OF THE INVENTION

AN object of the present invention is to provide a semiconductor memory device in which information concerning bit errors is obtained.

Another object of the present invention is to provide a semiconductor memory device in which the number of bit errors remedied by an ECC circuit can be counted.

Still another object of the present invention is to provide an EEPROM in which the number of bit errors corrected by an ECC circuit is counted and the counted information is easily read out from the exterior as required.

A semiconductor memory device according to the present invention has a function of checking and correcting bit errors, which comprises storing means for storing information of a plurality of bits and error check and correcting means for checking and correcting bit errors of information stored in the storing means. The error check and correcting means generates a predetermined count signal every time a bit error is corrected. The semiconductor memory device further comprises counting means for counting the predetermined count signal generated from the error check and correcting means.

According to the semiconductor memory device of the present invention, every time a bit error is corrected by the error check and correcting means, the number of times of correction is counted by the counting means. Therefore, the number of failure bits stored in the storing means in the semiconductor memory device can be known.

As described in the foregoing, according to the present invention, in the semiconductor memory device having the error check and correcting means, effective information can be obtained which can evaluate the reliability and can make an improvement in the design or the manufacturing process.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
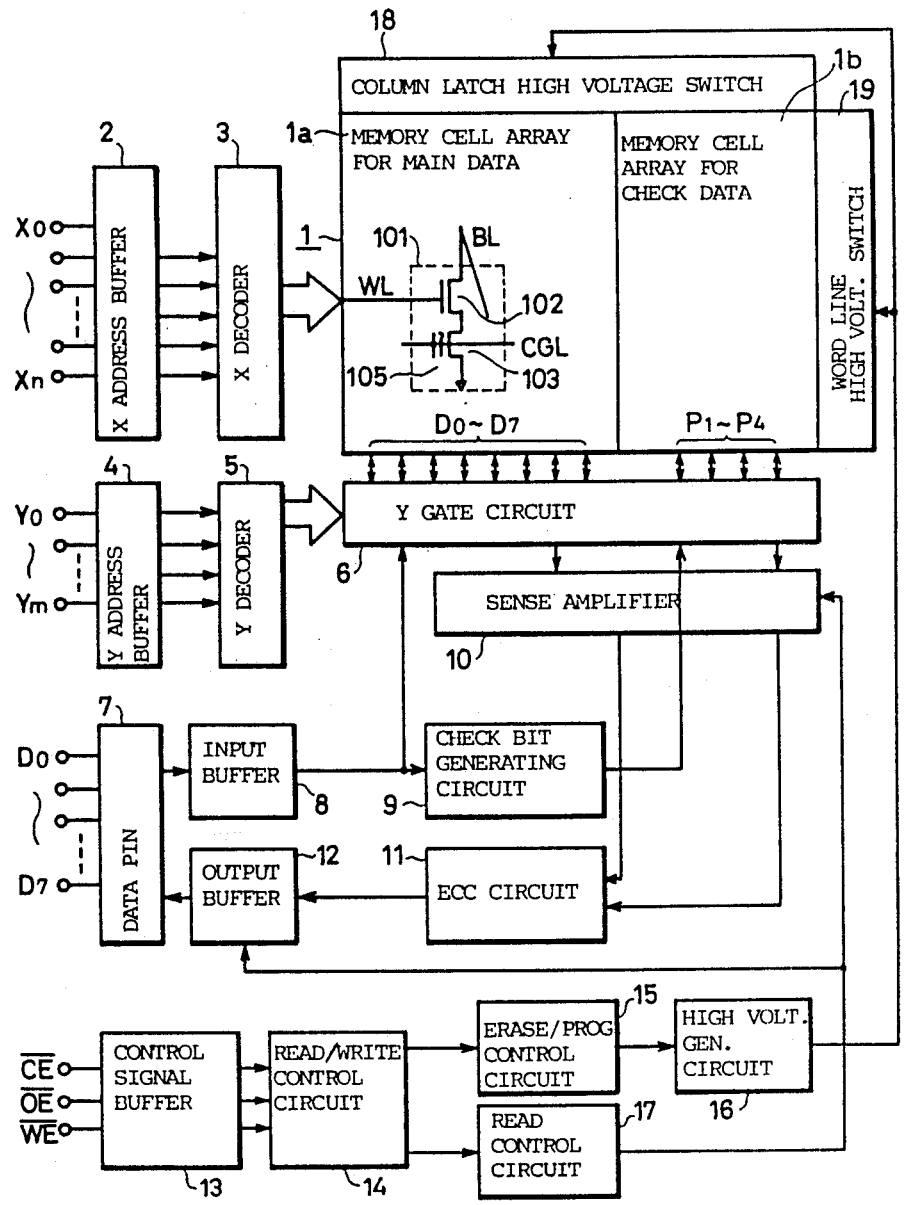
FIG. 1 is a block diagram showing one example of a structure of a conventional EEPROM having an ECC circuit.

Referring now to the drawings, one embodiment of the present invention will be described in detail.

Figure 5:
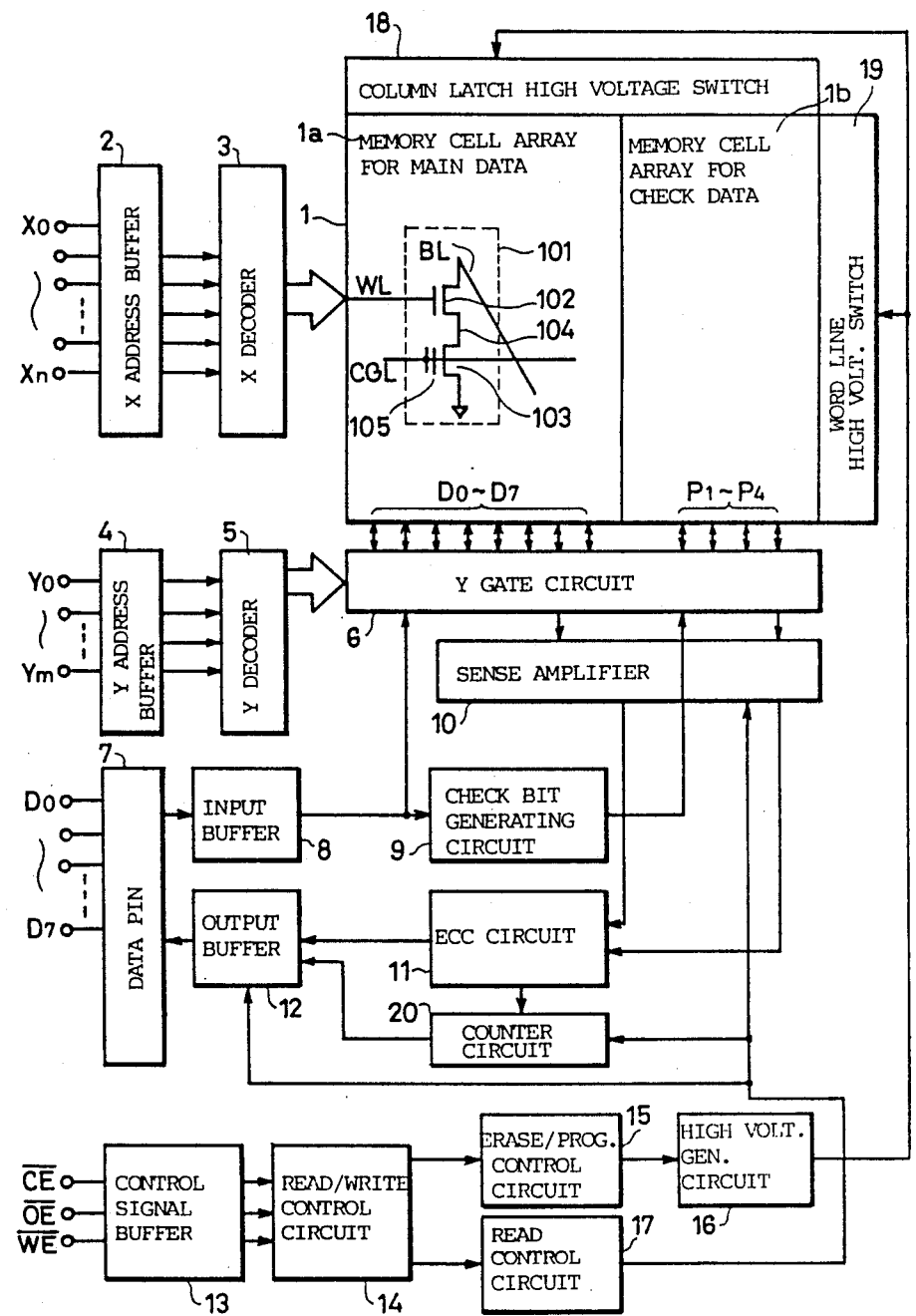
FIG. 5 is a block diagram showing a structure of an EEPROM according to one embodiment of the present invention.

FIG. 5 is a block diagram showing a structure of an EEPROM according to one embodiment of the present invention.

An EEPROM shown in FIG. 5 is the same as the conventional EEPROM shown in FIG. 1 except for the following. The EEPROM shown in FIG. 5 is provided with a counter circuit 20. An output of a read control circuit 17 and an output of an ECC circuit 11 are applied to the counter circuit 20. An output of counter circuit 20 is applied to an output buffer 12.

Figure 6:
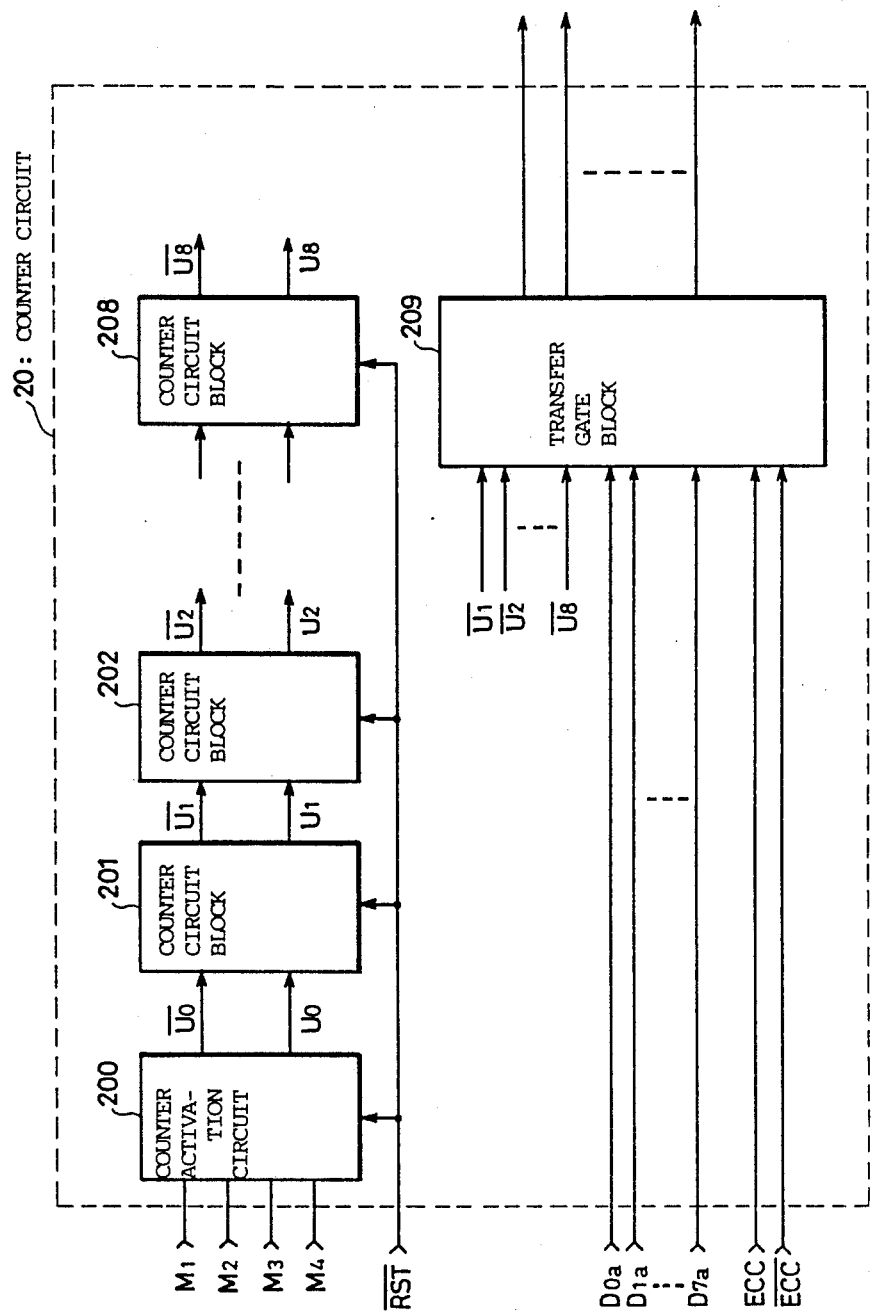
FIG. 6 is a diagram showing one example of a structure of a counter circuit included in the EEPROM shown in FIG. 5.

FIG. 6 is a block diagram showing a structure of the counter circuit 20.

Figure 4:
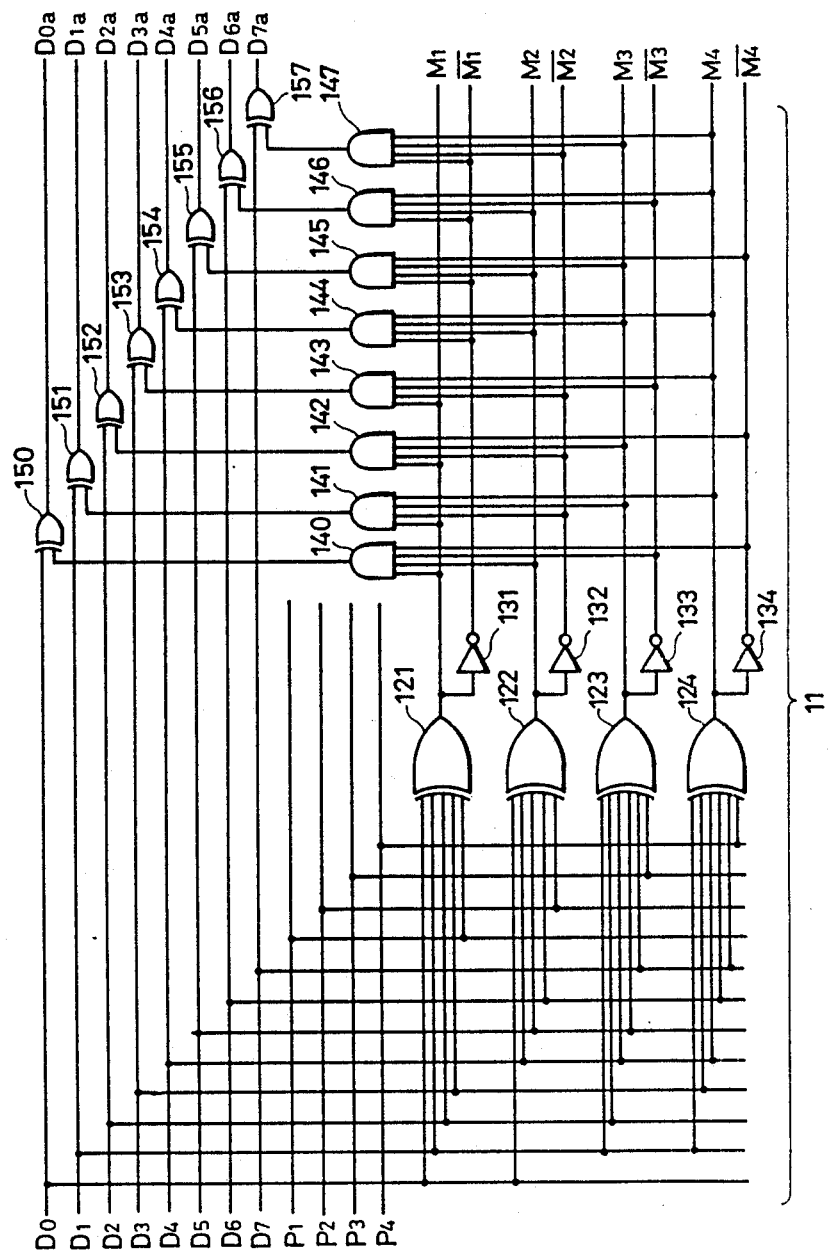
FIG. 4 is a logic diagram showing a structure of the ECC circuit included in the EEPROM shown in FIG. 1.

In FIG. 6, the counter circuit 20 comprises a counter activating circuit 200, counter circuit blocks 201 to 208 in eight stages, and a transfer gate block 209. Outputs M1 to M4 of the ECC circuit 11 shown in FIG. 4 are applied to the counter activating circuit 200. Outputs U0 and $\overline{U0}$ of the counter activating circuit 200 are applied to the counter circuit block 201 in the first stage. Outputs U1 and $\overline{U1}$ of the counter circuit block 201 in the first stage are applied to the counter circuit block 202 in the second stage. In the same manner, outputs of the counter circuit blocks in the preceding stage are applied to the counter circuit blocks 202 to 208, respectively. In addition, a reset signal $\overline{RST0}$ is applied to the counter activating circuit 200 and the counter circuit blocks 201 to 208 from the read control circuit 17 (see FIG. 5). The outputs $\overline{U1}$ to $\overline{U8}$ of the counter circuit blocks 201 to 208 are applied to the transfer gate block 209. In addition, the outputs $D_{0a}$ to $D_{7a}$ of the ECC circuit 11 shown in FIG. 4 are applied to the transfer gate block 209, and signals ECC and $\overline{ECC0}$ are applied thereto from the read control circuit 17 shown in FIG. 5.

Figure 7:
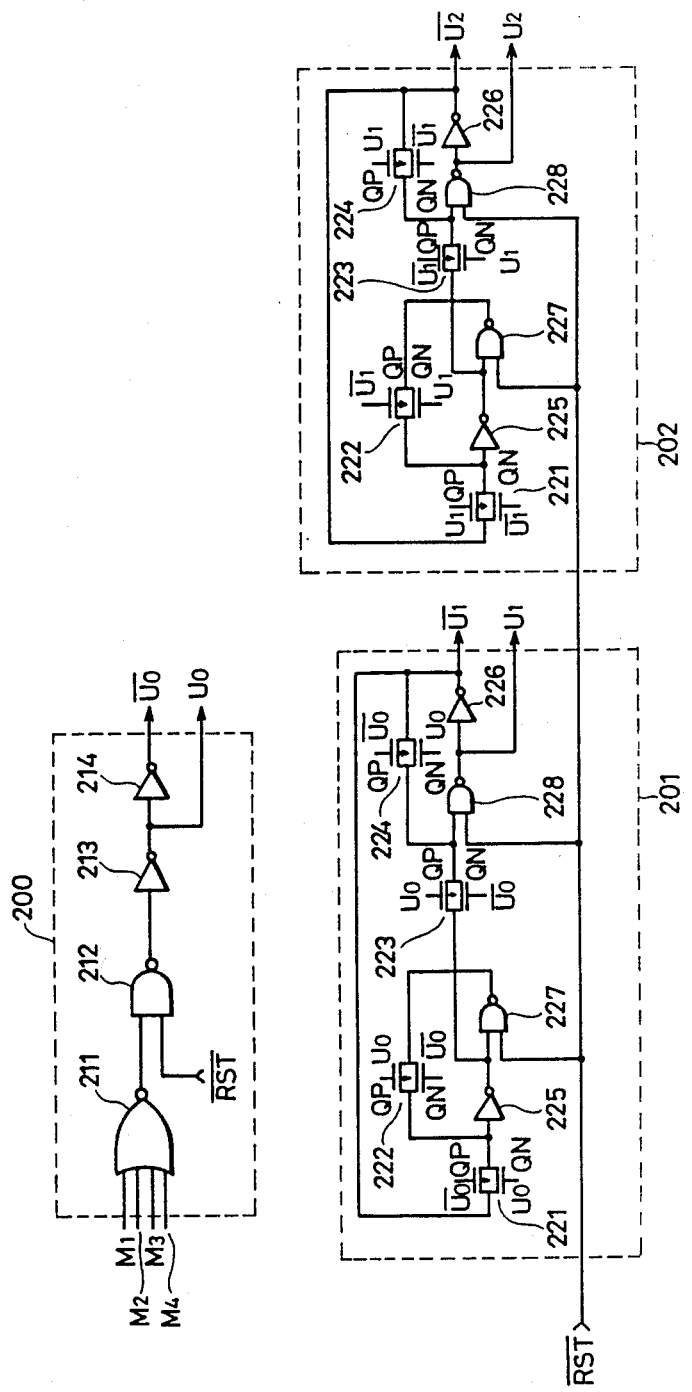
FIG. 7 is a circuit diagram showing a structure of a counter activating block and first and second counter circuit blocks included in the counter circuit shown in FIG. 6.

FIG. 7 is a circuit diagram showing structures of the counter activating circuit 200 and the counter circuit blocks 201 and 202 shown in FIG. 6.

The counter activating circuit 200 comprises an NOR circuit 211, an NAND circuit 212 and inverters 213 and 214. The outputs M1 to M4 of the ECC circuit 11 shown in FIG. 4 are applied to the NOR circuit 211. The NAND circuit 212 has one input terminal receiving an output of the NOR circuit 211 and another input terminal receiving the reset signal RST from the read control circuit 17. An output of the NAND circuit 212 is inverted by the inverter 213 and further inverted by the inverter 214. An output U0 of the inverter 213 and an output $\overline{U0}$ of the inverter 214 are applied to the counter circuit block 201 in the first stage.

The counter circuit block 201 comprises transfer gates 221 to 224, inverters 225 and 226 and NAND circuits 227 and 228. Each of the transfer gates 221 to 224 comprises an N channel MOS transistor QN and a P channel MOS transistor QP. The NAND circuit 227 has one input terminal receiving an output of the inverter 225 and another input terminal receiving the reset signal $\overline{RST}$ An output of the NAND circuit 227 is applied to an input terminal of the inverter 225 through the transfer gate 222. The NAND circuit 228 has one input terminal receiving the output of the inverter 225 through the transfer gate 223 and another input terminal receiving the reset signal $\overline{RST}$ An output of the NAND circuit 228 is applied to an input terminal of the inverter 226. An output of the inverter 226 is applied to one input terminal of the NAND circuit 228 through the transfer gate 224. In addition, the output of the inverter 226 is applied to the input terminal of the inverter 225 through the transfer gate 221.

The output $\overline{U0}$ of the counter activating circuit 200 is applied to a gate of the transistor QP in the transfer gate 221, a gate of the transistor QN in the transfer gate 222, a gate of the transistor QN in the transfer gate 223 and a gate of the transistor QP in the transfer gate 224. The output U0 of the counter activating circuit 200 is applied to a gate of the transistor QN in the transfer gate 221, a gate of the transistor QP in the transfer gate 222, a gate of the transistor QP in the transfer gate 223 and a gate of the transistor QN in the transfer gate 224. The output $\overline{U1}$ of the inverter 226 and the output U1 of the NAND circuit 228 are applied to the counter circuit block 202 in the second stage. The counter circuit block 202 in the second stage comprises transfer gates 221 to 224, inverters 225 and 226 and NAND circuits 227 and 228, similarly to the counter circuit block 201 in the first stage. The output of the counter circuit block 201 in the first stage is applied to a gate of the transistor QN in the transfer gate 221, a gate of the transistor QP in the transfer gate 222, a gate of the transistor QP in the transfer gate 223 and a gate of the transistor QN in the transfer gate 224. The output $\overline{U1}$ of the counter circuit block 201 in the first stage is applied to a gate of the transistor QP in the transfer gate 221, a gate of the transistor QN in the transfer gate 222, a gate of the transistor QN in the transfer gate 223 and a gate of the transistor QP in the transfer gate 224.

An output $\overline{U2}$ of the inverter 226 and an output U2 of the NAND circuit 228 in the counter circuit block 202 in the second stage are applied to a counter circuit block 203 (not shown) in the third stage. The structures of the counter circuit blocks 203 to 208 in the third to eighth stages are the same as the structure of the counter circuit block 201 in the first stage or the counter circuit block 202 in the second stage.

Figure 8:
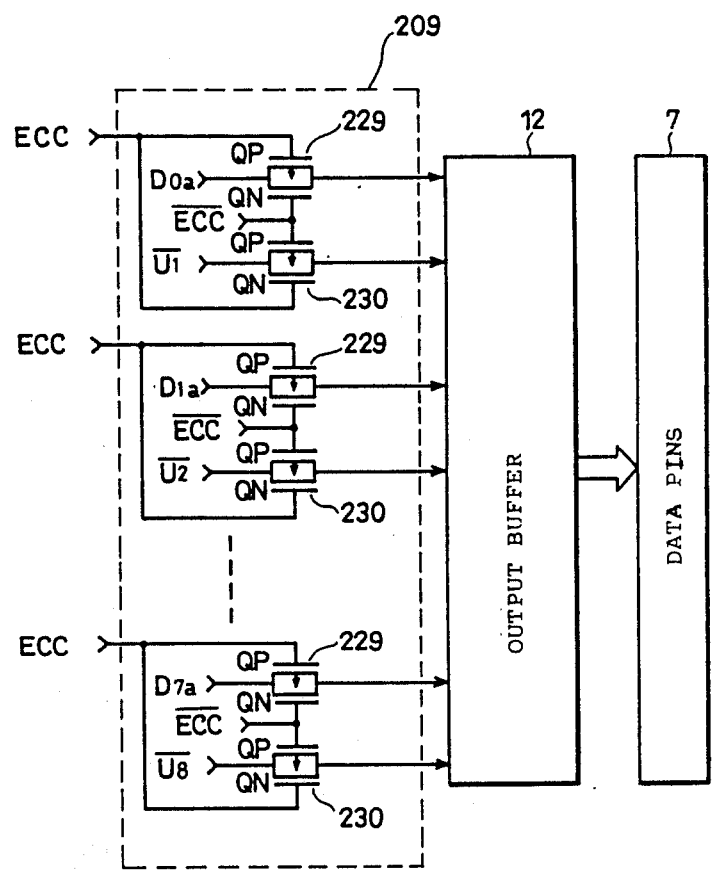
FIG. 8 is a diagram showing one example of a structure of a circuit for controlling reading of data from the counter circuit shown in FIG. 6 and reading of data from a memory transistor.

FIG. 8 is a circuit diagram showing a structure of the transfer gate block 209 shown in FIG. 6.

In FIG. 8, the transfer gate block 209 comprises eight transfer gates 229 and eight transfer gates 230. Each of the transfer gates 229 and 230 comprises an N channel MOS transistor QN and a P channel MOS transistor QP. The outputs $D_{0a}$ to $D_{7a}$ of the ECC circuit 11 shown in FIG. 4 are applied to an output buffer 12 through the transfer gates 229, respectively. The outputs $\overline{U1}$ to $\overline{U8}$ of the counter circuit blocks 201 to 208 shown in FIGS. 6 and 7 are applied to the output buffer 12 through the transfer gates 230, respectively. The signal ECC from the read control circuit 17 is applied to gates of the transistors QP in the transfer gates 229 and gates of the transistors QN in the transfer gates 230. The signal $\overline{ECC0}$ from the read control circuit 17 is applied to gates of the transistors QN in the transfer gates 229 and gates of the transistors QP in the transfer gates 230.

Figure 2:
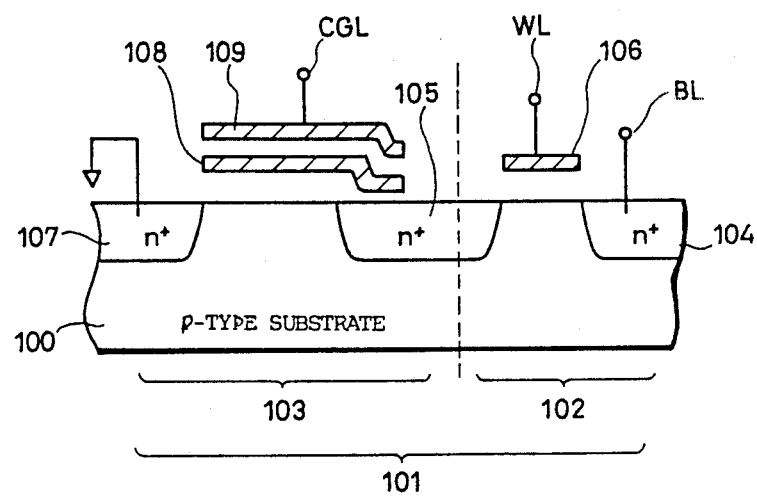
FIG. 2 is a cross-sectional view showing a memory cell included in the EEPROM shown in FIG. 1.
Figure 3:
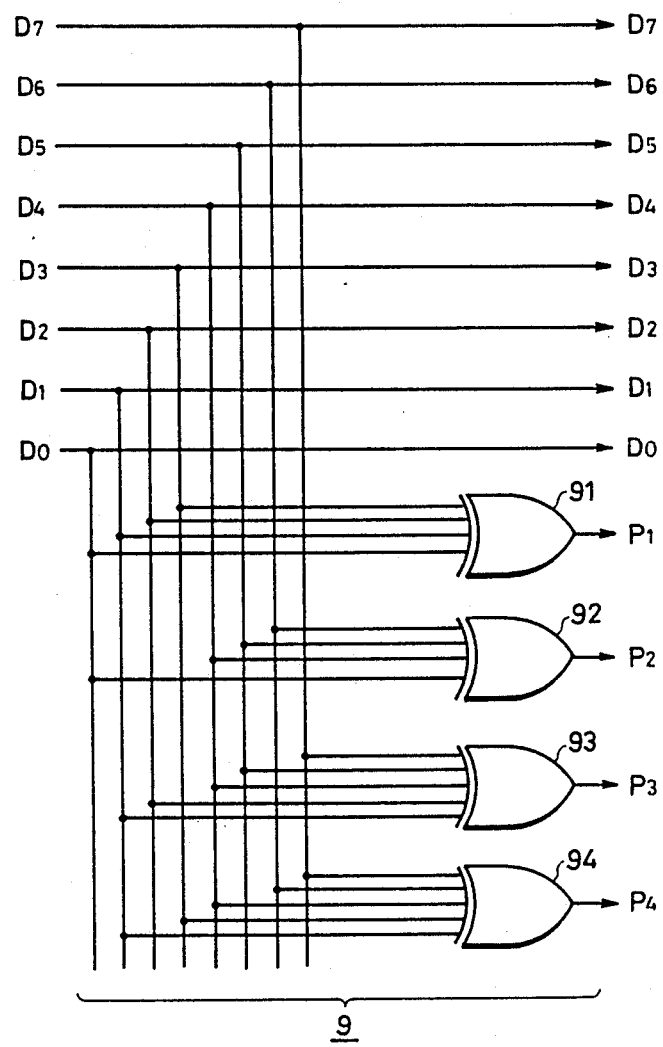
FIG. 3 is a logic diagram showing a structure of a check bit generating circuit included in the EEPROM shown in FIG. 1.

Meanwhile, structures of the other circuits shown in FIG. 5 are the same as those shown in FIG. 1. More specifically, the structures of a memory cell 101, a check bit generating circuit 9 and an ECC circuit 11 are the same as those shown in FIGS. 2, 3 and 4, respectively. The same or corresponding portions have the same reference numerals.

Figure 9:
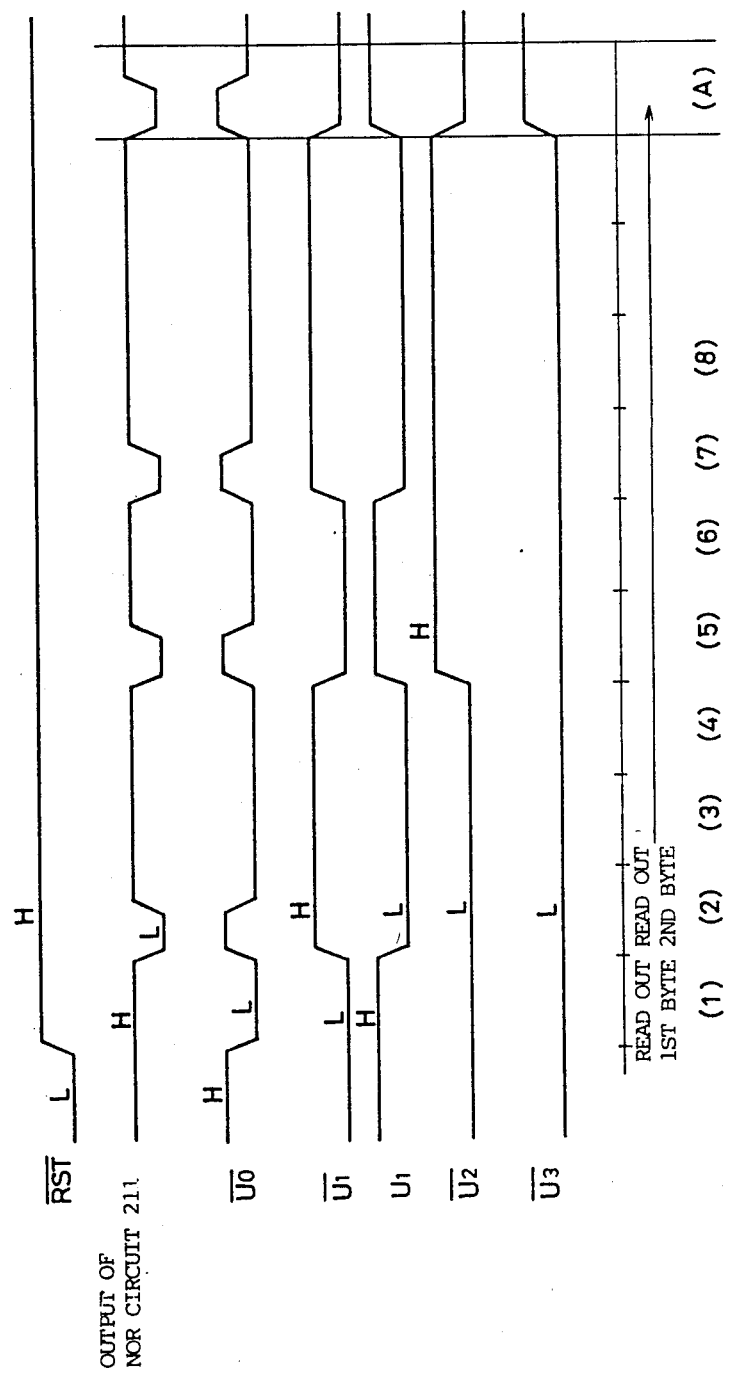
FIG. 9 is a timing chart for explaining an operation of the counter circuit shown in FIGS. 6 and 7.

Referring now to a timing chart of FIG. 9, description is made of an operation to occur when the number of bit errors corrected by the ECC circuit 11 is read out in the EEPROM having the above described structure. In the timing chart of FIG. 9, outputs $\overline{U1}$ to $\overline{U3}$ are shown and outputs $\overline{U4}$ to $\overline{U8}$ are omitted.

The reset signal $\overline{RST0}$ first attains an "L" level. While the reset signal $\overline{RST0}$ is at the "L" level, the output $\overline{U0}$ of the counter activating circuit 200 shown in FIG. 7 attains an "H" level and all the outputs $\overline{U1}$ to $\overline{U8}$ of the counter circuit blocks 201 to 208 all attain the "L" level, which shows a state in which the counted number is zero. Then, when a chip enable signal $\overline{CE0}$ and an output enable signal $\overline{OE0}$ are inputted, there is formed a line of a control signal buffer 13, a read/write control circuit 14 and a read control circuit 17, so that a sense amplifier 10, an output buffer 12 and a counter circuit 20 are activated. When the counter circuit 20 is set to a mode of counting the number of remedied bits, the reset signal $\overline{RST0}$ rises from the "L" level to the "H" level. The mode of counting the number of remedied bits is set by, for example, setting the chip enable signal $\overline{CE0}$ at a potential higher than an ordinary level. Thereafter, signals X0 to Xn are inputted through an X address buffer 2 and signals Y0 to Yn are inputted through a Y address buffer 4, so that data stored in all addresses in a memory cell array 1 are sequentially read out.

On this occasion, when data read out from the address is checked and corrected by the ECC circuit 11 and then outputted because a memory transistor in a given address has become a failure bit, at least one of the outputs M1 to M4 of the EXOR circuits 121 to 124 shown in FIG. 4 certainly attains the "H" level, as described in the prior art. Consequently, the output of the NOR circuit 211 and the output of the NAND circuit 212 in the counter activating circuit 200 shown in FIG. 7 attain the "L" level and the "H" level, respectively. Therefore, the output U0 of the inverter 213 and the output $\overline{U0}$ of the inverter 214 attain the "L" level and the "H" level, respectively (corresponding to the read cycle (2) in the second byte shown in FIG. 9). The outputs U0 and $\overline{U0}$ are inputted to the gate of the transistor QP or QN constituting each of the transfer gates 221 to 224 in the counter circuit block 201 in the first stage. When the output U0 of the "L" level is applied to the transistor QP and the output UO of the "H" level is applied to the transistor QN, the transfer gate is rendered conductive. More specifically, the transfer gates 222 and 223 are rendered conductive while the transfer gates 221 and 224 are rendered non-conductive. Consequently, the input of the inverter 225 remains at the "L" level while the output thereof remains at the "H" level. In addition, the output of the NAND circuit 227 remains at the "L" level. Thus, since the output of the "H" level is applied to one input terminal of the NAND circuit 228 and the reset signal $\overline{RST0}$ of the "H" level is applied to the other input terminal thereof, the output U1 attains the "L" level. The output U1 of the NAND circuit 228 and the reset signal $\overline{RST}$ of the "H" level is output $\overline{U1}$ attains the "H" level (cycle (2) in FIG. 9).

Therefore, in the second counter circuit block 202, the transfer gates 221 and 224 are rendered conductive while the transfer gates 222 and 223 are rendered non-conductive. Thus, the output $\overline{U2}$ remains at the "L" level while the output U2 remains at the "H" level.

Thereafter, when the outputs M1 to M4 of the ECC circuit 11 return to the "L" level and the output of the NOR circuit 211 in the counter activating circuit 200 shown in FIG. 7 attains the "H" level, the transfer gates 221 and 224 in the counter circuit block 201 in the first stage is rendered conductive while the transfer gates 222 and 223 therein is rendered non-conductive. Consequently, the levels of the outputs $\overline{U1}$ and $\overline{U2}$ are maintained (cycles (3) and (4) in FIG. 9).

The outputs of the counter circuit blocks are sequentially inputted to the transfer gates in the counter circuit blocks in the subsequent stage, so that the same operation as that of the first counter circuit block 201 or the second counter circuit block 202 is performed in each of the counter circuit blocks.

Then, when either one of the outputs M1 to M4 of the ECC circuit attains the "H" level so that the output of the NOR circuit 211 in the counter activating circuit 200 shown in FIG. 7 attains the "L" level, the transfer gates 222 and 223 in the counter circuit block 201 in the first stage are rendered conductive while the transfer gates 221 and 224 therein are rendered non-conductive. Consequently, the output attains the "L" level while the output $\overline{U1}$ attains the "H" level (cycle (5) in FIG. 9).

Thus, in the second counter circuit block 202, the transfer gates 222 and 223 are rendered conductive while the transfer gates 221 and 224 are rendered non-conductive. Consequently, the output $\overline{U2}$ attains the "H" level while the output U2 attains the "L" level.

The levels of the outputs $\overline{U1}$ and $\overline{U2}$ are maintained until the output of the NOR circuit 211 in the counter activating circuit 200 next attains the "L" level (cycle (6) in FIG. 9).

Then, when the output of the NOR circuit 211 in the counter activating circuit 200 attains the "L" level, the output $\overline{U1}$ of the counter circuit block 201 in the first stage attains the "H" level while the output $\overline{U2}$ of the second counter circuit block 202 attains the "H" level (cycle (7) in FIG. 9.).

Therefore, the output $\overline{U1}$ of the counter circuit block 201 in the first stage repeatedly attains the "L" and "H" levels every time the output of the NOR circuit 211 in the counter activating circuit 200 falls from the "H" level to the "L" level. In addition, the output $\overline{U2}$ of the counter circuit block 202 in the second stage repeatedly attains the "H" and "L" levels every time the output $\overline{U1}$ of the counter circuit block 201 in the first stage falls from the "H" level to the "L" level. Similarly, the respective outputs $\overline{U3}$ to $\overline{U8}$ of the counter circuit blocks 203 to 208 in the third to eighth stages repeatedly attain the "H" and the "L" levels every time the outputs of the counter circuit blocks in the preceding stage fall from the "H" level to the "L" level, respectively. More specifically, the counter circuit blocks 201 to 208 in the first to eighth stages constitute a so-called counter circuit.

In the above described manner, when data of the entire memory cell array 1 are read out so that the output of the NOR circuit 211 in the counter activating circuit 200 attains the "L" level four times (cycle (A) in FIG. 9), the outputs and $\overline{U3}$, $\overline{U2}$ and $\overline{U1}$ attain the "H" level, the "L" level and the "L" level, i.e., "1", "0" and "0", so that the counter circuit 20 stores the fact that the number of bits remedied by the ECC circuit 11 is 4.

Thereafter, when the signal ECC applied from the read control circuit 17 to the transfer gate block 209 (see FIG. 8) in the counter circuit 20 attains the "H" level and a signal $\overline{ECC0}$ obtained by inverting the signal ECC attains the "L" level, the transfer gate 230 is rendered conductive while the transfer gate 229 is rendered non-conductive. As a result, the outputs $\overline{U1}$ to $\overline{U8}$ of the counter circuit blocks 201 to 208 in the first to eighth stages are read out to the exterior from a data pin 7 though the output buffer 12 as count data, respectively. The outputs $\overline{U1}$ to $\overline{U8}$ indicate the number of all corrected bits.

When the signal ECC is at the "L" level and the signal $\overline{ECC}$ is at the "H" level, the transfer gate 229 is rendered conductive while the transfer gate 230 is rendered non-conductive. Consequently, the outputs $D_{0a}$ to $D_{7a}$ of the ECC circuit 11 are read out to the exterior from the data pin 7 through the output buffer 12 as corrected data.

Although in the above described embodiment, the respective outputs $\overline{U1}$ to $\overline{U8}$ of the counter circuit blocks 201 to 208 are read out in parallel, the outputs $\overline{U1}$ to $\overline{U8}$ may be serially read out.

In addition, the mode of counting the number of remedied bits is generally employed by manufacturers for the design or the check. Thus, although in the above described embodiment, the mode of counting the number of remedied bits is set by applying a potential higher than a logical level generally employed by users, the mode of counting the number of remedied bits may be set by another method.

Furthermore, although in the above described embodiment, the signal ECC attains the "H" level so that count data is read out after data are read out from all addresses, the signal ECC may attain the "H" level when a counting operation is started.

Additionally, although in the above described embodiment, the counter circuit 20 is formed on the chip on which the other circuits in the EEPROM are formed, the counter circuit 20 may be formed separately from the other circuits.

Additionally, although in the above described embodiment, description was made on a case in which the EEPROM is provided with a counter circuit, the present invention can be also applied to an EPROM (Erasable Programmable Read-Only Memory), an OTP (One Time Programmable) ROM, a DRAM (Dynamic Random Access Memory) and an SRAM (Static Random Access Memory), to obtain the same effect as that of the above described embodiment.

As described in the foregoing, according to the present invention, since the number of bit errors corrected by the error check and correcting means is counted in the semiconductor memory device, the reliability of the semiconductor memory device can be evaluated, so that effective information is obtained which can make an improvement in the design or the manufacturing process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device having a function for checking and correcting bit errors, comprising:
    storing means for storing information of a plurality of bits,
    error check and correcting means for checking and correcting bit errors of the information stored in said storing means,
    said error check and correcting means generating a predetermined count signal every time it corrects a bit error,
    counting means for counting said predetermined count signal generated from said error check and correcting means and
    output means for selectively outputting the information read out from said storing means and the number counted by said counting means.

2. The semiconductor memory device according to claim 1, wherein
    said output means is responsive to a read command signal externally applied for outputting information indicating the counted number.

3. The semiconductor memory device according to claim 2, wherein
    said storing means, said error check and correcting means and said counting means are formed on the same semiconductor substrate.

4. The semiconductor memory device according to claim 1, wherein
    said counting means is responsive to a counting starting signal externally applied for starting a counting operation after the information indicating the counted number previously stored is erased and outputting the information indicating the counted number after the information stored in said storing means is read out.

5. The semiconductor memory device according to claim 4, wherein
    said counting starting signal has a potential of a higher level than an ordinary logical level.

6. The semiconductor memory device according to claim 4, wherein
    said storing means, said error check and correcting means and said counting means are formed on the same semiconductor substrate.

7. The semiconductor memory device according to claim 1, wherein
    said storing means, said error check and correcting means and said counting means are formed on the same semiconductor substrate.

8. The semiconductor memory device according to claim 1, wherein
    said storing means comprises a plurality of memory cells each storing information.

9. The semiconductor memory device according to claim 8, wherein
    each of said plurality of memory cells comprises an electrically erasable and programmable read-only memory.

10. A semiconductor memory device having a function for checking and correcting bit errors, comprising:
    a memory cell array comprising a plurality of memory cells arranged in a plurality of rows and columns,
    first selecting means for selecting any of rows in said memory cell array,
    second selecting means for selecting any of columns in said memory cell array,
    writing means for writing data to the memory cell selected by said first and second selecting means,
    reading means for reading out data stored in the memory cell selected by said first and second selecting means,
    error check and correcting means for checking and correcting bit errors included in data stored in the memory cell selected by said first and second selecting means,
    said error check and correcting means generating a predetermined count signal every time it corrects a bit error,
    counting means for counting said predetermined count signal generated from said error check and correcting means and
    output means for selectively outputting the information read out from said storing means and the number counted by said counting means.

11. The semiconductor memory device according to claim 10, wherein said memory cell array comprises a data region for storing data bits and a check bit region for storing check bits, said error check and correcting means comprises check bit generating means for generating check bits based on data bits stored in said data bit region in said memory cell array and applying the same to said check bit region, and check and correcting means responsive to said check bits stored in said check bit region in said memory cell array for checking and correcting bit errors of said corresponding data bits.

12. The semiconductor memory device according to claim 11, wherein said counting means is responsive to a counting starting signal externally applied for starting a counting operation after the information indicating the counted number previously stored is erased and outputting the information indicating the counted number after the information stored in said storing means is read out.

13. The semiconductor memory device according to claim 10, wherein each of said plurality of memory cells comprises an electrically erasable and programmable read-only memory.

14. A method for operating a semiconductor memory device comprising storing means for storing information of a plurality of bits, and error check and correcting means for checking and correcting bit errors of the information stored in said storing means, comprising the steps of:

generating a predetermined count signal every time a bit error is detected by said error check and correcting means, counting said predetermined count signal and selectively outputting either information read out from said storing means or the number counted in said counting step.

15. A semiconductor memory device having a function for checking and correcting bit errors, comprising:

storing means for storing information of a plurality of bits, error check and correcting means for checking and correcting bit errors of the information stored in said storing means, said error check and correcting means generating a predetermined count signal every time it corrects a bit error, and counting mans for counting said predetermined count signal generated from said error check and correcting means, wherein said counting means is responsive to a counting starting signal externally applied for starting a counting operation after the information indicating the counted number of previously stored is erased and outputting the information indicating the counted number after the information stored in said storing means is read out.

* * * * *